United States Patent
Frash et al.

(10) Patent No.: US 6,741,007 B2
(45) Date of Patent: May 25, 2004

(54) PERMANENT MAGNET MOTOR ASSEMBLY HAVING A DEVICE AND METHOD OF REDUCING PARASITIC LOSSES

(75) Inventors: Martin W. Frash, Newburyport, MA (US); Richard L. Hockney, Lynnfield, MA (US); Michael F. Smith, Concord, MA (US)

(73) Assignee: Beacon Power Corporation, Wilmington, MA (US)

( * ) Notice: Subject to any disclaimer, the term of this patent is extended or adjusted under 35 U.S.C. 154(b) by 0 days.

(21) Appl. No.: 09/917,289

(22) Filed: Jul. 27, 2001

(65) Prior Publication Data

US 2003/0020349 A1 Jan. 30, 2003

(51) Int. Cl.[7] .................................................. H02K 1/12
(52) U.S. Cl. ...................... 310/254; 310/40 R; 310/214; 310/208; 310/216; 310/156.01
(58) Field of Search ............................... 310/67 R, 254, 310/40 R, 156.01, 156.28, 156.37, 156.36, 208, 216, 214, 266, 156.31, 261, 271, 156, 156.26

(56) References Cited

U.S. PATENT DOCUMENTS

| | | | | |
|---|---|---|---|---|
| 3,912,956 A | * | 10/1975 | Muller ...................... 310/68 C |
| 4,286,184 A | * | 8/1981 | Kogler et al. .............. 310/67 R |
| 4,433,261 A | * | 2/1984 | Nashiki et al. ......... 310/156.28 |
| 4,827,170 A | * | 5/1989 | Kawamura et al. ........... 290/52 |
| 4,894,738 A | * | 1/1990 | Elsasser et al. ........... 360/97.01 |
| 5,004,944 A | | 4/1991 | Fisher |
| 5,105,114 A | * | 4/1992 | Sickle et al. ............ 310/154.13 |
| 5,157,295 A | * | 10/1992 | Stefansky et al. ............. 310/90 |
| 5,247,410 A | * | 9/1993 | Ebihara et al. ........... 360/264.9 |
| 5,252,873 A | * | 10/1993 | Hamamoto et al. ............ 310/90 |
| 5,333,079 A | * | 7/1994 | Takegami et al. ......... 360/99.08 |
| 5,446,610 A | * | 8/1995 | Elsaesser et al. ......... 360/99.08 |
| 5,557,487 A | * | 9/1996 | Elsaesser et al. ......... 360/99.08 |
| 5,667,309 A | * | 9/1997 | Nose ........................... 384/132 |
| 5,774,302 A | * | 6/1998 | Elsaesser et al. ......... 360/98.07 |
| 5,801,900 A | * | 9/1998 | Elsaesser et al. ......... 360/98.07 |
| 5,808,392 A | * | 9/1998 | Sakai et al. .................. 310/214 |
| 5,862,686 A | * | 1/1999 | Skrippek ..................... 68/140 |
| 6,018,438 A | * | 1/2000 | Nottingham et al. ..... 360/98.07 |
| 6,130,494 A | * | 10/2000 | Schob ........................ 310/90.5 |
| 6,147,427 A | * | 11/2000 | Ackermann et al. ... 310/154.36 |
| 6,211,595 B1 | * | 4/2001 | Nose ........................... 310/90.5 |
| 6,219,199 B1 | * | 4/2001 | Sakuragi et al. ......... 360/99.08 |
| 6,242,826 B1 | * | 6/2001 | Saito et al. .................... 310/51 |
| 6,274,955 B1 | * | 8/2001 | Satoh et al. ................... 310/71 |
| 6,301,074 B2 | * | 10/2001 | Sakuragi et al. ......... 360/99.08 |
| 6,320,288 B1 | * | 11/2001 | Suzuki et al. ............. 310/68 B |
| 6,359,363 B1 | * | 3/2002 | Foerstera et al. ............ 310/239 |
| 6,369,483 B1 | * | 4/2002 | Hill ............................. 310/216 |
| 6,404,586 B2 | * | 6/2002 | Sakuragi et al. ......... 360/99.08 |
| 2001/0005296 A1 | * | 6/2001 | Sakuragi et al. ......... 360/99.08 |
| 2002/0047387 A1 | * | 4/2002 | Obara ........................... 310/90 |

FOREIGN PATENT DOCUMENTS

WO    WO 96/42132    12/1996

* cited by examiner

*Primary Examiner*—Burton S. Mullins
*Assistant Examiner*—Heba Elakssabgi
(74) *Attorney, Agent, or Firm*—David G. Conlin; Steven M. Jensen; Edwards & Angell, LLP

(57) ABSTRACT

A permanent magnet motor assembly for use in a flywheel is disclosed, including a rotor, a stator, and a coil positioned in the stator. One or more magnets is attached to the rotor such that magnetic field lines are directed radially toward the coil for generating torque and thus driving the motor. A shield covers the magnet, preventing the magnetic flux lines from impacting a plate on the stator and causing excess heat and energy losses. The shield can be a cup or a snap-fit ring preferably made of magnetic steel which directs stray magnetic flux lines toward the rotor to be converted into useful work.

13 Claims, 2 Drawing Sheets

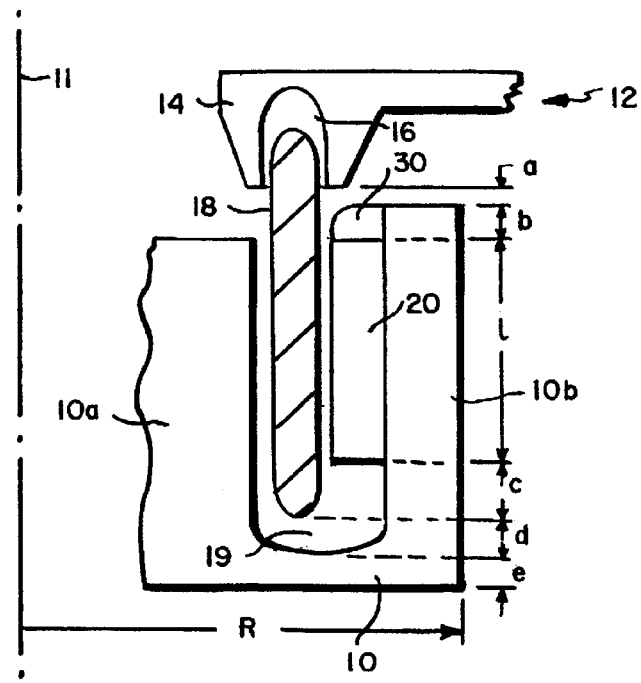
FIG. 1
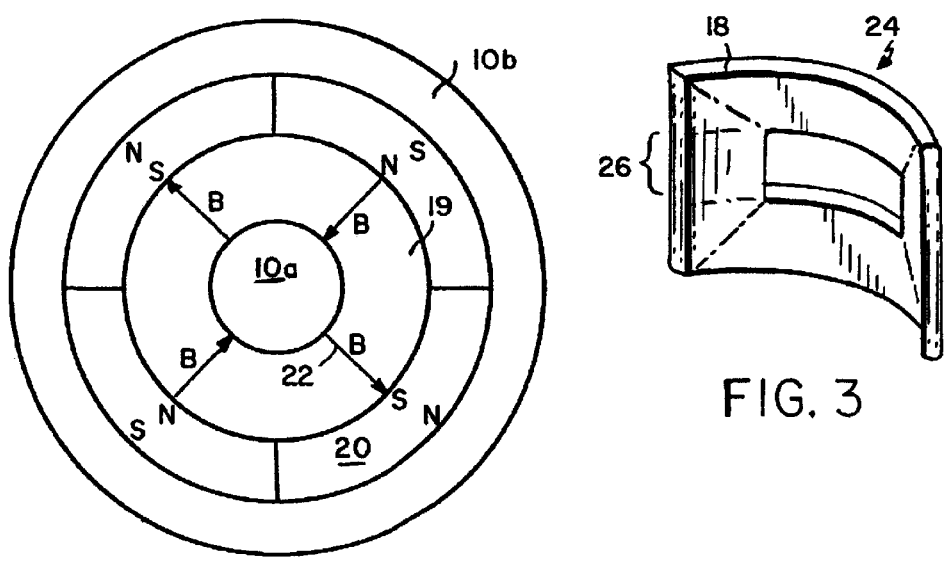
FIG. 2
FIG. 3

US 6,741,007 B2

PERMANENT MAGNET MOTOR ASSEMBLY HAVING A DEVICE AND METHOD OF REDUCING PARASITIC LOSSES

FIELD OF INVENTION

The present invention relates generally to permanent magnet motor assemblies, and more particularly to devices and methods for improving motor efficiency by reducing parasitic losses.

BACKGROUND OF THE INVENTION

The ability of flywheels to accept and release energy over relatively short time periods has been known for many years and energy storage flywheels have been used, or proposed for use, in a variety of applications. Such proposed and actual use applications include motor vehicle applications and stand alone supplemental energy sources.

Flywheels store energy by spinning a rotor about an axis, the rotor having magnets attached thereto for generating a magnetic field (in the form of magnetic flux lines), which reacts with a motor stator to produce torque. The motor stator is in the form of a plate with a cut-out section for receiving a copper coil. During acceleration of the rotor, energy is transferred by the motor to the rotor and can be stored in the rotor. However, some of the energy is not transferred to the rotor, but is instead lost in the motor stator, resulting in undesirable heat generation in the stator and reducing the efficiency of the motor. Losses in the motor stator, e.g. losses resulting from eddy currents, are referred to as "parasitic" losses. Therefore, it would be desirable to provide an improved flywheel having a mechanism to reduce or substantially eliminate such parasitic losses between the magnet and the stator.

SUMMARY OF THE INVENTION

A permanent magnet motor assembly is disclosed including a device and method for shielding a stator of the motor against stray magnetic fields which produce parasitic losses. The motor assembly includes the stator, a rotor, and a shield, wherein the stator has a cut-out section or groove for receiving a coil. The coil is preferably made of strands of copper having a specified number of turns. A rotor positioned adjacent the coil rotates about an axis, as a result of interaction between current in the coil and the magnetic field generated by magnets mounted on the rotor.

Each of the magnets preferably is mounted along a length of the rotor and includes a proximal end positioned near the stator and another end opposite the proximal end. The shield covers the proximal end of each magnet to reduce magnetic flux leakage through the proximal end of the magnet. Magnetic flux leakage occurs when portions of the magnetic field, instead of reaching the rotor, either interfere with the stator or escape the system. Such leakage results in parasitic losses in the motor assembly. Specifically, these stray magnetic field lines can produce eddy current losses in the stator, generating heat and further reducing system efficiency. By providing a shield covering the proximal end of each magnet, such stray magnetic field lines are re-directed away from the stator, thereby improving system efficiency.

Preferably, in the herein described invention, the rotor is made of magnetic steel and the shield is also made of magnetic steel. In one illustrative embodiment, the shield is a magnetic steel cup extending around the proximal end of the magnet which can be designed to fit tightly against the rotor, such that the magnetic steel cup is substantially integral with the rotor. In another illustrative embodiment, the shield is a snap-fit ring of magnetic steel extending around the rotor and fitting within a cut-out portion of the rotor.

Other aspects and embodiments of the invention are discussed below.

BRIEF DESCRIPTION OF THE DRAWING

For a fuller understanding of the nature and desired objects of the present invention, reference is made to the following detailed description taken in conjunction with the accompanying drawing figures wherein like reference characters denote corresponding parts throughout the several views and wherein:

FIG. 1 is a partial cross-sectional side view through a permanent magnet motor assembly according to the present invention;

FIG. 2 is a plan view of the motor assembly of FIG. 1 showing the relative positions of the rotor, magnets, and stator;

FIG. 3 is a perspective view of a section of copper coil which can be arranged in the stator assembly;

DESCRIPTION OF THE PREFERRED EMBODIMENT(S)

Figure 4:
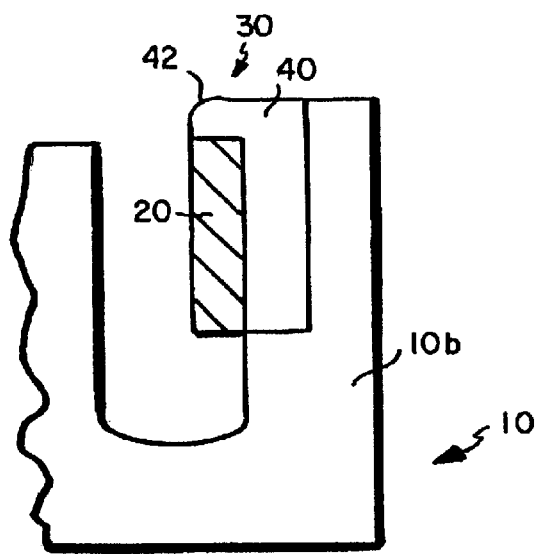
FIG. 4 is a partial cross-sectional side view of one arrangement of the motor shield including a magnetic steel cup according to the present invention.

Referring now to the various figures of the drawing wherein like reference characters refer to like parts, there is shown in the various views of FIGS. 1 and 2 a motor assembly including a rotor 10 which produces torque as it rotates about an axis 11. A stator 12 includes a plate 14 having a cut-out section or groove 16 for receiving a coil 18. The coil 18 includes a top and a bottom and is suspended within the groove 16 at its top thereof (as shown in FIG. 1). The bottom of the coil 18 is positioned within a hollow area 19 formed by the rotor that is configured in the shape of a "U". The particular design of the rotor provides that during rotation the rotor 10 does not contact the coil 18, which remains stationary. The rotor includes a top and bottom ends arranged in a longitudinal direction parallel to the coil 18. The top end of the rotor is proximate the stator. At the bottom of the rotor, the rotor has a thickness e in the longitudinal direction, where the bottom of the coil is positioned a distance d+e from the bottom of the rotor 10.

One or more magnets 20 are mounted along a length l of the rotor, preferably located radially between the coil 18 and the rotor 10. As shown in FIG. 1, according to a preferred design of the motor assembly, the rotor 10 includes a first rotor section 10a and a second rotor section 10b, with the hollow area 19 being defined as the region between the first and second rotor sections. In the embodiment of FIG. 1, magnet 20 is mounted lengthwise on the second rotor section 10b and includes a proximal end positioned at a height corresponding to the distance a+b below the stator 12, extending from approximately the top of the first rotor section 10a downward into the hollow area 19. The bottom of the magnet 20 is preferably positioned at a distance c from the bottom of the coil 18, although in other embodiments the magnet and coil can terminate at approximately the same point. The magnet 20 acts as a field source for driving the rotor 10, which in conjunction with current in the coil 18, causes rotation of the rotor 10 about the axis 11. Useful work is performed along the length of the magnet 20 in a manner well known in the art.

As shown in FIG. 2, the one or more magnets 20 are positioned radially between the first rotor section 10a and the second rotor section 10b and are preferably attached to the second rotor section 10b. In the present embodiment four magnets 20 are shown, but the number of magnets is not limited to four, and in other embodiments more or fewer magnets can be used. In a preferred arrangement, the magnets 20 are each mounted on the rotor, adjacent magnets having opposite polarities, thereby producing alternating magnetic field, or flux lines 22. The magnetic field lines produced by the magnets 20 provide energy for driving the rotor, causing the rotor to rotate about its axis. The magnets can be made of a number of materials known in the art, including those embodying rare earth elements, for example: neodymium boron iron (NdBFe), samarium cobalt (SmCo), and aluminum nickel cobalt (AlNiCo).

As shown in FIG. 1, a shield 30 is attached to the rotor 10 and is preferably arranged above the magnet 20 to cover the top end of the magnet. The shield can be made of magnetic steel, for example, a material similar in composition to the rotor, or other materials as herein described. The magnetic field lines 22 produced by the magnet 20, as shown in FIG. 2, generally are directed radially toward the rotor 10 and the coil 18. However, at the ends of the magnet 20, the magnetic field lines tend to curve away from the magnet 20. In prior art motors, in which there is no shield or cap covering an end of the magnet adjacent the stator, these field lines either interfere with the stator or escape from the rotor, thereby lowering system efficiency. The shield 30 as shown in FIG. 1 substantially eliminates flux leakage from the proximal end of the magnet 20 and redirects the field lines toward the rotor 10.

FIG. 3 illustrates a 120° section of coil 24 preferably used in the stator of the motor assembly along with two similar sections to form the coil 18. The coil depicted in FIG. 3 is one section of a three-phase motor, but a similar coil can be used with a motor having two or more phases, as is known in the art. As used in the flywheel system of FIG. 1, the three sections 24 are attached together to form a 360° section of coil fixed in the stator 12. The coil section 24 can be positioned within the hollow area 19 of the rotor 10, as shown in FIG. 1.

The coil section 24 preferably is made of copper and includes a specified number of turns. As shown in FIG. 3, the coil section can be made of 16-gauge copper wire wrapped in 29 turns. The wire preferably is broken into parallel strands which are twisted together in order to minimize eddy current losses, according to a method known in the art. The coil 18 (including multiple sections 24) is arranged within the hollow area 19 as shown in FIGS. 1 and 2. Useful work is produced in a central region 26 of the coil section 24 which is arranged radially across from the magnet.

The stator 12, as depicted in FIG. 1, includes the plate 14 which is preferably made of aluminum or another thermally conductive material. To hold the coil 18, an epoxy or other thermally conductive substance is used, which, along with the plate 14, functions to remove heat from the coil 18 during rotation of the rotor 10. The shield 30 tends to block stray flux lines from impacting the stator and causing further heat build-up on the stator. By providing a shield, additional heat and eddy current losses are substantially eliminated from the stator 12. The total heat measured on the stator, which can amount to hundreds of watts of energy in prior art motors, is reduced by about one to two orders of magnitude using the shield 30 as taught by the present invention.

FIG. 4 illustrates one embodiment of the shield 30 according to the present invention, in which the shield comprises a cup 40 which rests tightly against the rotor 10 on one side and against each magnet 20 on another side, covering the top end of the magnet 20. The cup preferably is made of magnetic steel or a similar material, such as the material used in the rotor 10. Materials useful for constructing the cup 40 include carbon steels such as 1018 and 1026, and high strength alloys such as 4340 steel. As shown in FIG. 4, the cup 40 includes a shielding portion 42 covering the top end of the magnet. Preferably, the shielding portion 42 includes a taper at the top end thereof to direct any stray magnetic flux lines toward the rotor 10. In a preferred method of manufacturing the shield, the cup 40 and magnet 20 are first bonded together and thereafter attached to the rotor 10 as a single piece.

Figure 5A:
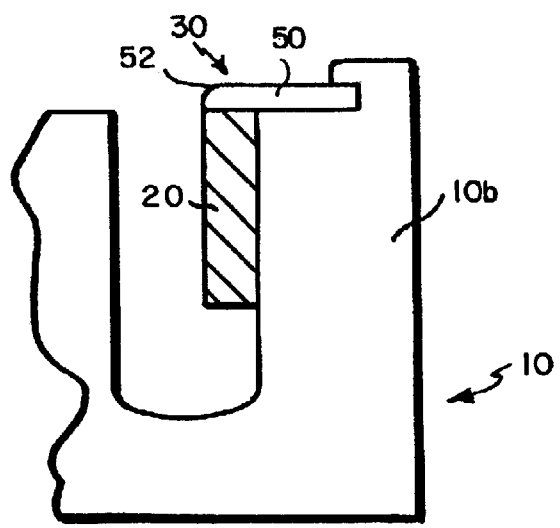
FIG. 5A is a partial cross-sectional side view of another arrangement of the motor shield including a snap-fit steel ring according to the present invention.
Figure 5B:
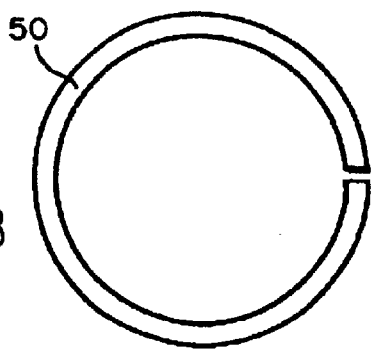
FIG. 5B is a plan view of the steel ring of FIG. 5A.

FIGS. 5A and 5B illustrate another embodiment of the shield 30 according to the present invention, in which the shield comprises a ring 50 attached to the rotor and covering each magnet 20. Preferably the ring 50 is a snap-fit ring made of spring steel or a similar material. The ring can include a taper on a shielding portion 52 which covers the top end of the magnet.

The rotor 10 preferably is made of a high strength steel material, in order to withstand rotation speeds which can exceed about 25,000 rpm. The herein described components of the motor assembly operate in close proximity to each other. For example, the radial clearance between the coil 18 and the magnet 20 can be approximately 0.025 inches. In an illustrative, exemplary embodiment described with reference to FIG. 1, the following distances can be used: a is approximately 0.125 inches, b is approximately 0.160 inches, l is approximately 1.60 inches, c is approximately 0.180 inches, d is approximately 0.190 inches, e is approximately 0.150 inches, and R is approximately 3.00 inches. The above dimensions are not meant to limit the herein described invention, and are provided for illustrative purposes only.

Although a preferred embodiment of the invention has been described using specific terms, such description is for illustrative purposes only, and it is to be understood that changes and variations may be made without departing from the spirit or scope of the following claims.

What is claimed is:

1. A permanent magnet motor assembly, comprising:
   a stator including a coil and having a cut-out section in which the coil is received and suspended;
   a rotor having an end proximate the stator, and including a first rotor section and a second rotor section rotating about an axis, wherein the coil is positioned between the first and second rotor sections;
   a magnet having a proximal end near the stator and positioned lengthwise along the second rotor section to thereby rotate about the coil; and
   a shield covering the proximal end of the magnet to reduce magnetic field leakage between the proximal end of the magnet and the stator.

2. The permanent magnet motor assembly of claim 1, wherein the shield is made of magnetic steel.

3. The permanent magnet motor assembly of claim 1, wherein the shield comprises a cup extending around the proximal end of the magnet and against the rotor.

4. The permanent magnet motor assembly of claim 1, wherein the shield comprises a snap-fit ring.

5. The permanent magnet motor assembly of claim 4, wherein the snap-fit ring is made of spring steel.

6. A permanent magnet motor assembly, comprising:
   a stator including a coil and having a cut-out section in which the coil is received and suspended;
   a rotor having an end proximate the stator, and including a first rotor section and a second rotor section rotating about an axis, wherein the coil is positioned between the first and second rotor sections;
   a plurality of magnets, each magnet having a proximal end near the stator and positioned lengthwise along the second rotor section to thereby rotate about the coil; and
   a shield covering the proximal end of each magnet to reduce magnetic field leakage between the proximal end of each magnet and the stator.

7. A permanent magnet motor assembly, comprising:
   a stator;
   a rotor having an end proximate the stator, the rotor rotating about an axis;
   a magnet positioned along a length of the rotor and having a proximal end positioned near the stator; and
   a shield covering the proximal end of the magnet to reduce magnetic field leakage between the proximal end of the magnet and the stator, wherein the shield comprises a cup extending around the proximal end of the magnet and against the rotor.

8. The permanent magnet motor assembly of claim 7, wherein the rotor includes a first rotor section and a second rotor section, the first rotor section being positioned radially inside the second rotor section relative to the axis.

9. The permanent magnet motor assembly of claim 8, wherein the magnet is attached to the second rotor section.

10. A permanent magnet motor assembly, comprising:
    a stator,
    a rotor having an end proximate the stator, the rotor rotating about an axis;
    a magnet positioned along a length of the rotor and having a proximal end positioned near the stator; and
    a shield covering the proximal end of the magnet to reduce magnetic field leakage between the proximal end of the magnet and the stator, wherein the shield comprises a snap-fit ring.

11. The permanent magnet motor assembly of claim 10, wherein the snap-fit ring is made of spring steel.

12. The permanent magnet motor assembly of claim 10, wherein the rotor includes a first rotor section and a second rotor section, the first rotor section being positioned radially inside the second rotor section relative to the axis.

13. The permanent magnet motor assembly of claim 12, wherein the magnet is attached to the second rotor section.

* * * * *